United States Patent [19]

Bolles

[11] 4,186,709

[45] Feb. 5, 1980

[54] IGNITION DISTRIBUTOR HOUSING ANTI-ROTATIONAL LOCKING ARRANGEMENT

[75] Inventor: Charles P. Bolles, Grosse Pointe Farms, Mich.

[73] Assignee: General Motors Corporation, Detroit, Mich.

[21] Appl. No.: 929,652

[22] Filed: Jul. 31, 1978

[51] Int. Cl.² ............................................... F02P 7/02
[52] U.S. Cl. ................................. 123/146.5 A; 403/338
[58] Field of Search ................... 123/146.5 A, 117 R, 123/146.5 R; 403/338, 373

[56] References Cited

U.S. PATENT DOCUMENTS

| | | | |
|---|---|---|---|
| 3,662,726 | 5/1972 | Haskew et al. | 123/146.5 A |
| 3,861,225 | 1/1975 | Mattson | 123/146.5 A |
| 4,040,407 | 8/1977 | Heine | 123/146.5 A |

Primary Examiner—Charles J. Myhre
Assistant Examiner—Andrew M. Dolinar
Attorney, Agent, or Firm—Richard G. Stahr

[57] ABSTRACT

To lock an internal combustion engine ignition distributor in the initial angular setting, the hold-down clamp member is provided with a tang portion that is accommodated in close tolerance fit by a complementary notch in the distributor mounting flange when the hold-down clamp is mounted upon the engine in a manner to securely clamp the distributor housing in place at the initial angular setting.

1 Claim, No Drawings

Patent No. 4,186,709                                                February 5, 1980

Charles P. Bolles

IGNITION DISTRIBUTOR HOUSING ANTI-ROTATIONAL LOCKING ARRANGEMENT

This invention relates to an internal combustion engine ignition distributor hold-down arrangement and, more specifically, to an arrangement for locking an internal combustion engine ignition distributor in the initial angular setting.

As is well-known in the automotive art, the ignition spark timing of an intermal combusiton engine may be adjusted in advance or in retard by loosening the hold-down clamp that secures the distributor is place and rotating the distributor housing. Because it is a simple matter to change engine ignition spark timing with this prior art ignition distributor clamping arrangement, a high number of engines may be tampered with in the field. As it is desirable for a variety of reasons to prevent the adjustment of the ignition distributor housing away from the initial factory angular setting, an ignition distributor housing anti-rotational locking arrangement for locking an internal combustion engine ignition distributor in the initial angular setting is desirable.

It is, therefore, an object of this invention to provide an improved internal combustion engine ignition distributor hold-down arrangement.

It is another object of this invention to provide an improved internal combustion engine ignition distributor hold-down arrangement for locking the ignition distributor in the initial angular setting.

In accordance with this invention, an ignition distributor housing anti-rotational locking arrangement is provided wherein a tang on the ignition distributor hold-down clamp is arranged to be accommodated by a notch in the distributor mounting flange in close tolerance fit when a bolt extending through an aperture in the hold-down clamp and threaded into an accommodating threaded bore of the engine is tightened to securely clamp the distributor housing in place at the initial angular setting.

For a better understanding of the present invention, together with additional objects, advantages and features thereof, reference is made to the following description and accompanying drawing in which.

Figure 1:
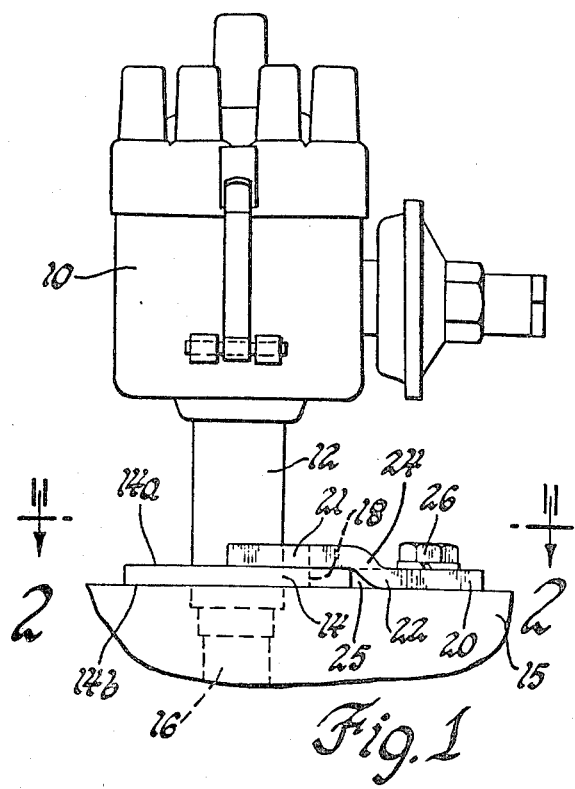
FIG. 1 is a plan view of an internal combustion engine ignition distribution mounted upon the associated internal combustion engine.
Figure 3:
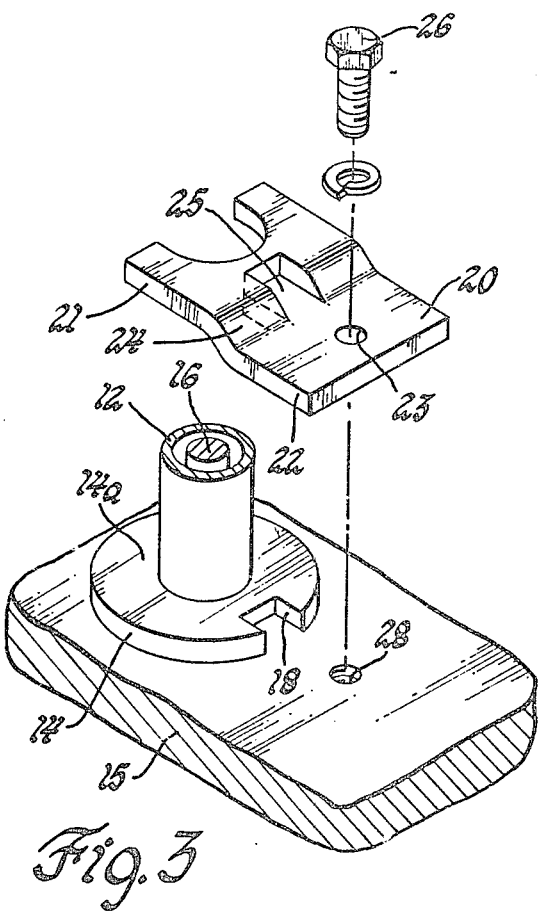
FIG. 3 is an exploded view of the ignition distributor housing anti-rotational locking arrangement of this invention.
Figure 1:
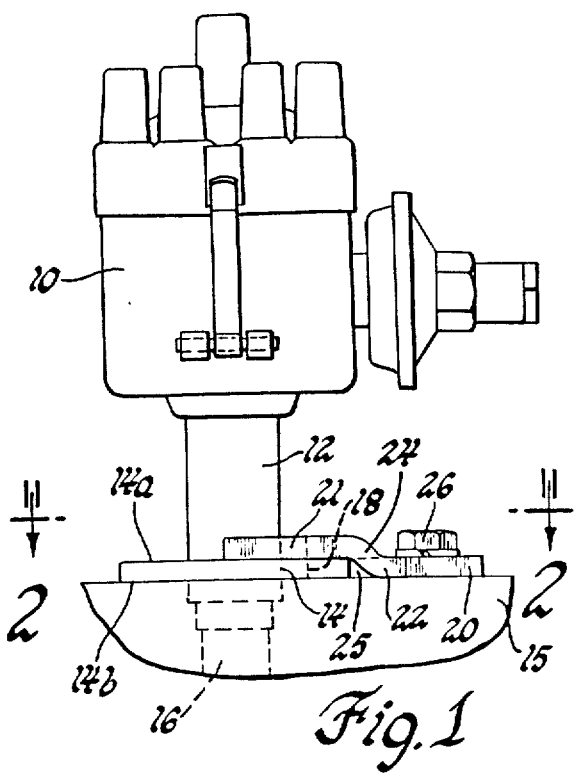
Figure 2A:
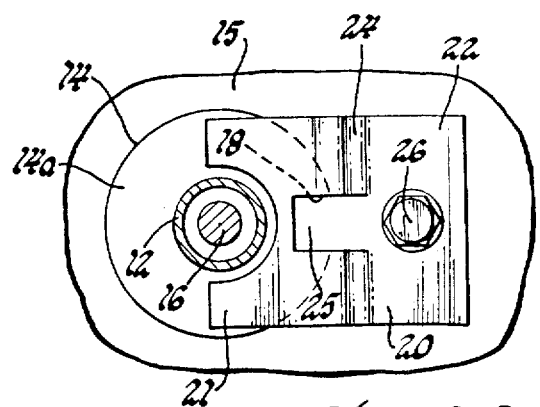
Figure 2B:
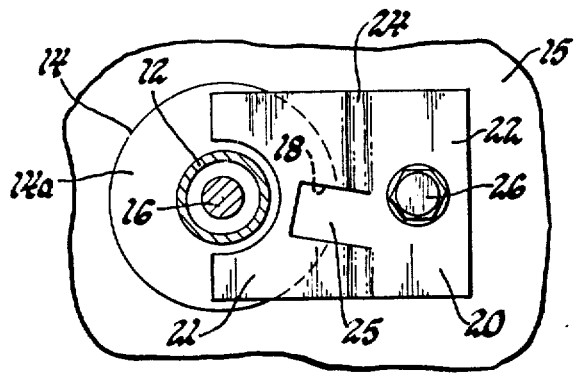
Figure 2C:
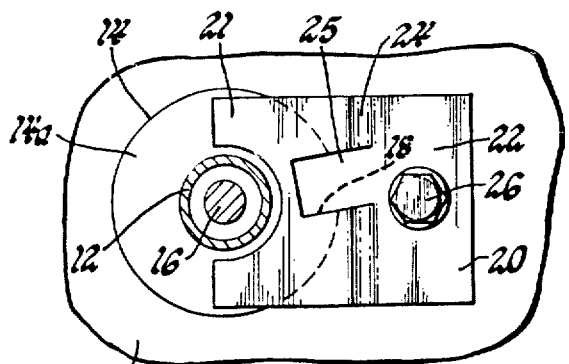
Figure 3:
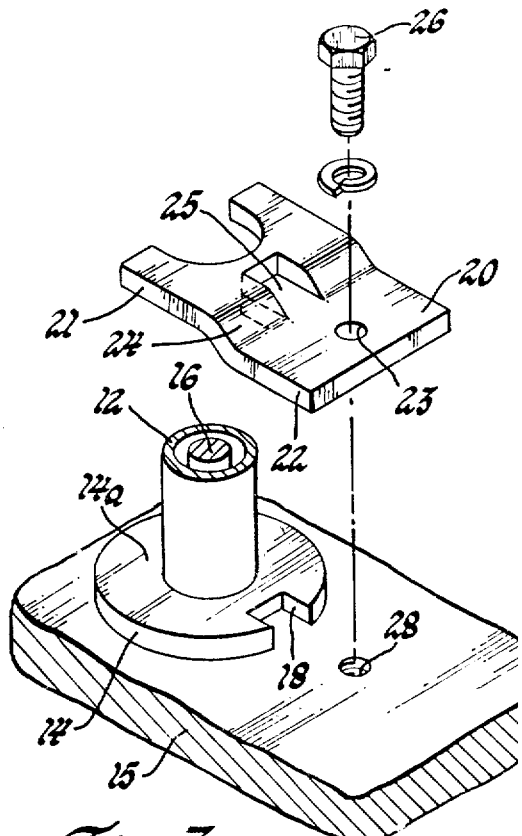

FIG. 1 illustrates an ignition distributor 10 having an unitary distributor housing 12 and mounting flange 14 arrangement rotatably mounted upon an internal combustion engine 15. Mounting flange 14 has a top surface 14A and a bottom surface 14B extending outwardly from the distributor housing 12 and also an inwardly extending notch 18, as best illustrated in FIG. 3. As is well-known in the automotive art, the distributor shaft 16 is inserted into an accommodating bore in engine 15 in such a manner that the spur gear, not shown, at the lower extremity thereof engages an accommodating gear on the engine camshaft, also not shown. When mounted in the manner as shown in FIG. 1, the unitary ignition distributor housing 12 and mounting flange 14 arrangement may be rotated upon the internal combustion engine 15 about the axis of rotation of the distributor shaft 16 as is well-known in the automotive art. The mounting flange 14 may be integral with the distributor housing 12 or it may be a separate mounting flange rigidly secured to distributor housing 12 in any suitable manner. It is only necessary that the distributor housing and mounting flange be rotatable only as a unit.

To securely clamp distributor housing 12 in place at the initial angular setting, a hold-down clamp 20 is employed. Hold-down clamp 20 has a first portion 21 for engaging the top surface 14A of mounting flange 14; a second portion 22 including a mounting bolt accommodating aperture 23 outboard of mounting flange 14 and offset from the first portion 21 by a distance substantially equal to the thickness of mounting flange 14 to a plane substantially parallel to that of the first portion 21 for engaging engine 15 and an intermediate portion 24 extending between the first portion 21 and second portion 22 outboard of mounting flange 14 and including a tang portion 25 extending inwardly toward mounting flange 14. Tang portion 25 is arranged to be so located that, when a mounting bolt 26 extending through aperture 23 and threaded into an accommodating threaded bore 28 of engine 15 is tightened to securely clamp distributor housing 12 in place at the initial angular setting, tang portion 25 of intermediate portion 24 is accommodated by the inwardly extending notch 18 of mounting flange 14 in a close tolerance fit whereby distributor housing 12 is securely maintained in the initial angular setting.

Figure 2A:
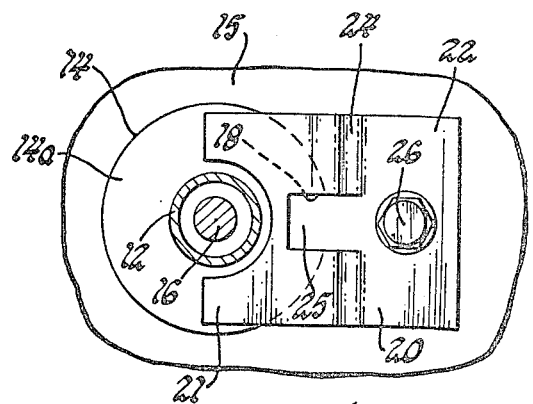
FIGS. 2A, 2B and 2C are cross-sectional views of FIG. 1 taken along line 2—2 and looking in the direction of the arrows for three respective initial angular settings of the ignition distributor housing.
Figure 2B:
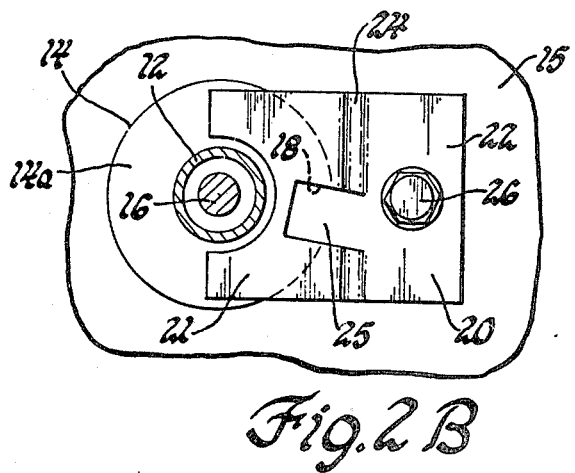
Figure 2C:
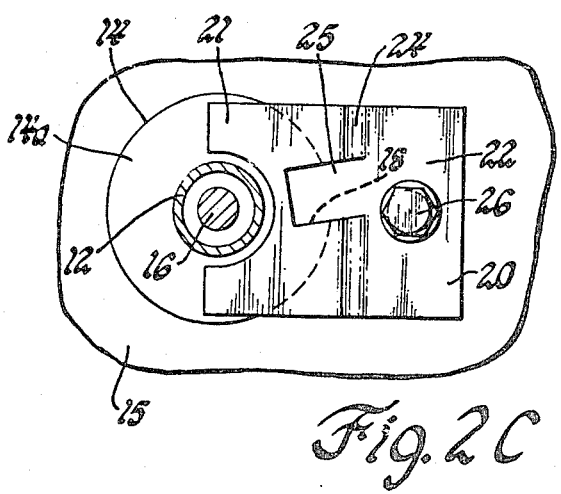

Because of manufacturing tolerances, the angular location of inwardly extending notch 18 of mounting flange 14 relative to engine 15 may not be precisely the same for different engines when timed to the manufacturer's ignition spark timing specification. Consequently, a series of hold-down clamps 20 having tang portions 25 at various offsets are provided to cover the complete range of engine variables. FIG. 2A illustrates a hold-down clamp 20 having a tang portion 25 so located that it is accommodated by inwardly extending notch 18 of mounting flange 14 when, at the initial angular setting of distributor housing 12, the inwardly extending notch is in alignment with mounting bolt 26. FIG. 2B illustrates a hold-down clamp 20 having a tang portion 25 so located that it is accommodated by inwardly extending notch 18 of mounting flange 14 when, at the initial angular setting of distributor housing 12, the inwardly extending notch is out of alignment with mounting bolt 26 in a clockwise direction. FIG. 2C illustrates a hold-down clamp 20 having a tang portion 25 so located that it is accommodated by inwardly extending notch 18 of mounting flange 14 when, at the initial angular setting of distributor housing 12, the inwardly extending notch 18 is out of alignment with mounting bolt 26 in a counterclockwise direction. It is to be specifically understood that FIGS. 2A, 2B and 2C illustrate only three examples of different hold-down clamp tang locations that may be provided as a larger variety of tang locations may be necessary to accommodate the complete range of engine variables.

The engine is initially timed to the manufacturer's specifications on a factory engine test stand by rotating the unitary distributor housing 12 and mounting flange 14 arrangement until the engine is timed to the manufacturer's specification. Upon the completion of the engine timing operation, a hold-down clamp 20 having a tang portion 25 so located that it is accommodated by inwardly extending notch 18 of mounting flange 14 at the initial angular setting is selected. A mounting bolt 26 is then inserted through aperture 23 into threaded bore 28 and tightened down to securely clamp distributor 12 housing in place at the initial angular setting with the tang portion 25 of the selected hold-down clamp 20 being accommodated by inwardly extending notch 18 of mounting flange 14 in close tolerance fit.

With the ignition distributor housing anti-rotational locking arrangement of this invention:

1. Unauthorized ignition distributor housing rotation away from the initial angular setting is prevented so long as the hold-down clamp 20 and tang portion 25 are not altered.
2. Any alteration of the hold-down clamp 20 and tang portion 25 is readily detectable.
3. Should the distributor be removed from the engine for service, it can be remounted on the engine only at the initial angular setting.

While a preferred embodiment of the present invention has been shown and described, it will be obvious to those skilled in the art that various modifications and substitutions may be made without departing from the spirit of the invention which is to be limited only within the scope of the appended claim.

The embodiments of the invention in which an exclusive property or privilege is claimed are defined as follows:

1. An ignition distributor housing anti-rotational locking arrangement comprising:

a unitary distributor housing and mounting flange arrangement rotatably mountable upon an internal combustion engine, said mounting flange having top and bottom surfaces extending outwardly from said distributor housing and an inwardly extending notch; and a hold-down clamp adapted to be mounted on said engine by a mounting bolt, said engine including a threaded bore for accommodating said bolt, and having a first portion for engaging said top surface of said mouting flange, a second apertured portion outboard of said mounting flange and offset from said first portion by a distance substantially equal to the thickness of said mounting flange to a plane substantially parallel to that of said first portion for engaging said engine and an intermediate portion extending between said first and second portions outboard of said mounting flange having a tang portion extending inwardly toward said mounting flange and so located that when said mounting bolt is extended through said aperture of said second portion and threaded into an accommodating threaded bore of said engine and is tightened to securely clamp said distributor housing in place at an initial angular setting, said tang portion of said intermediate portion is accommodated by said inwardly extending notch of said mounting flange in close tolerance fit whereby said distributor housing is securely maintained in the initial angular setting.

* * * * *

UNITED STATES PATENT AND TRADEMARK OFFICE
CERTIFICATE OF CORRECTION

PATENT NO. : 4,186,709
DATED : February 5, 1980
INVENTOR(S) : Charles P. Bolles

It is certified that error appears in the above—identified patent and that said Letters Patent is hereby corrected as shown below:

Insert Figures 1, 2A, 2B, 2C and 3 as set forth on the attached.

On the Title Page, "1 Claim, No Drawings" should read

-- 1 Claim, 5 Drawing Figures --.

Signed and Sealed this

Twenty-fourth Day of June 1980

[SEAL]

Attest:

Attesting Officer

SIDNEY A. DIAMOND

Commissioner of Patents and Trademarks

Patent No. 4,186,709  February 5, 1980

Charles P. Bolles